Figure 1:
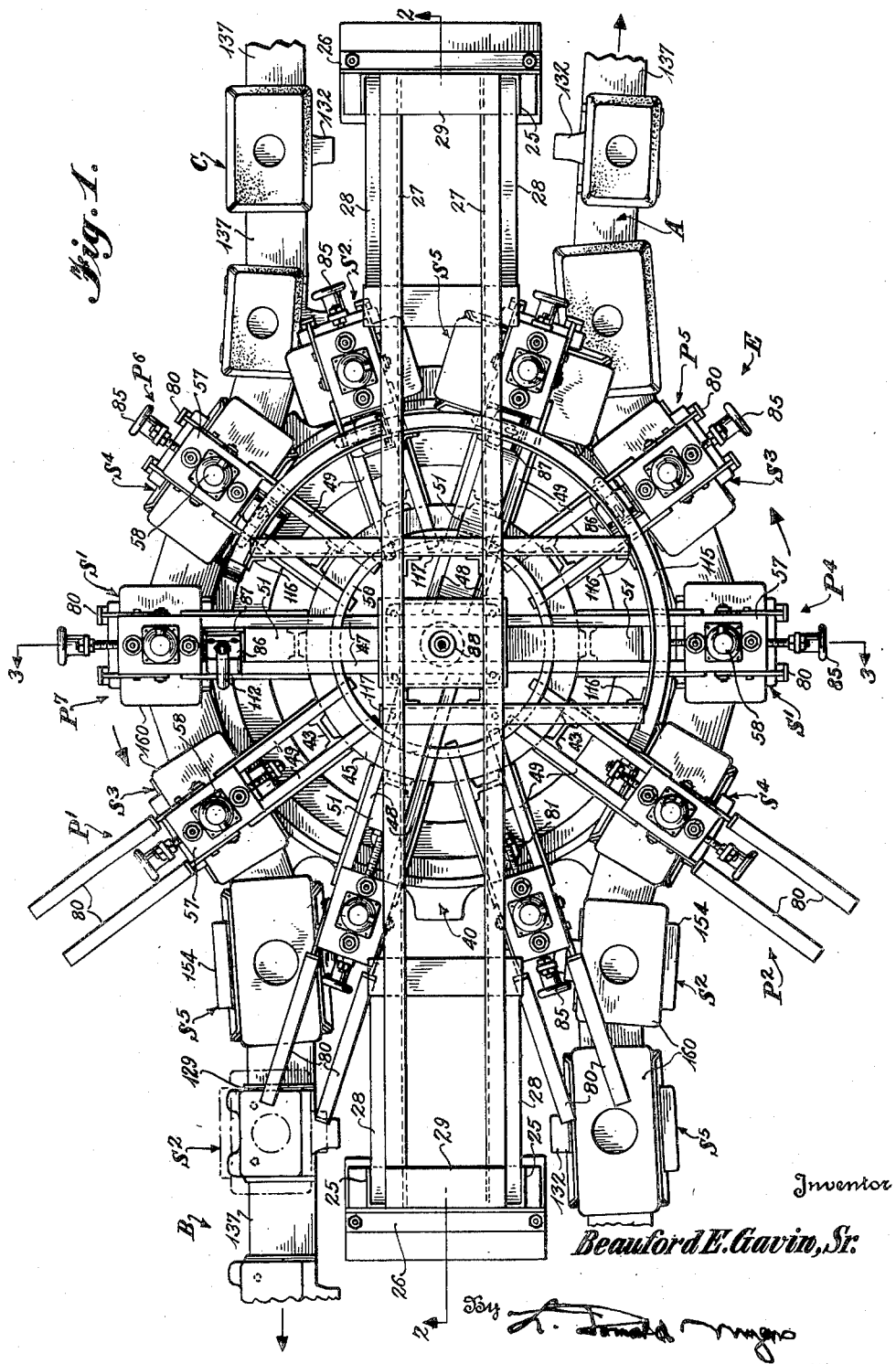

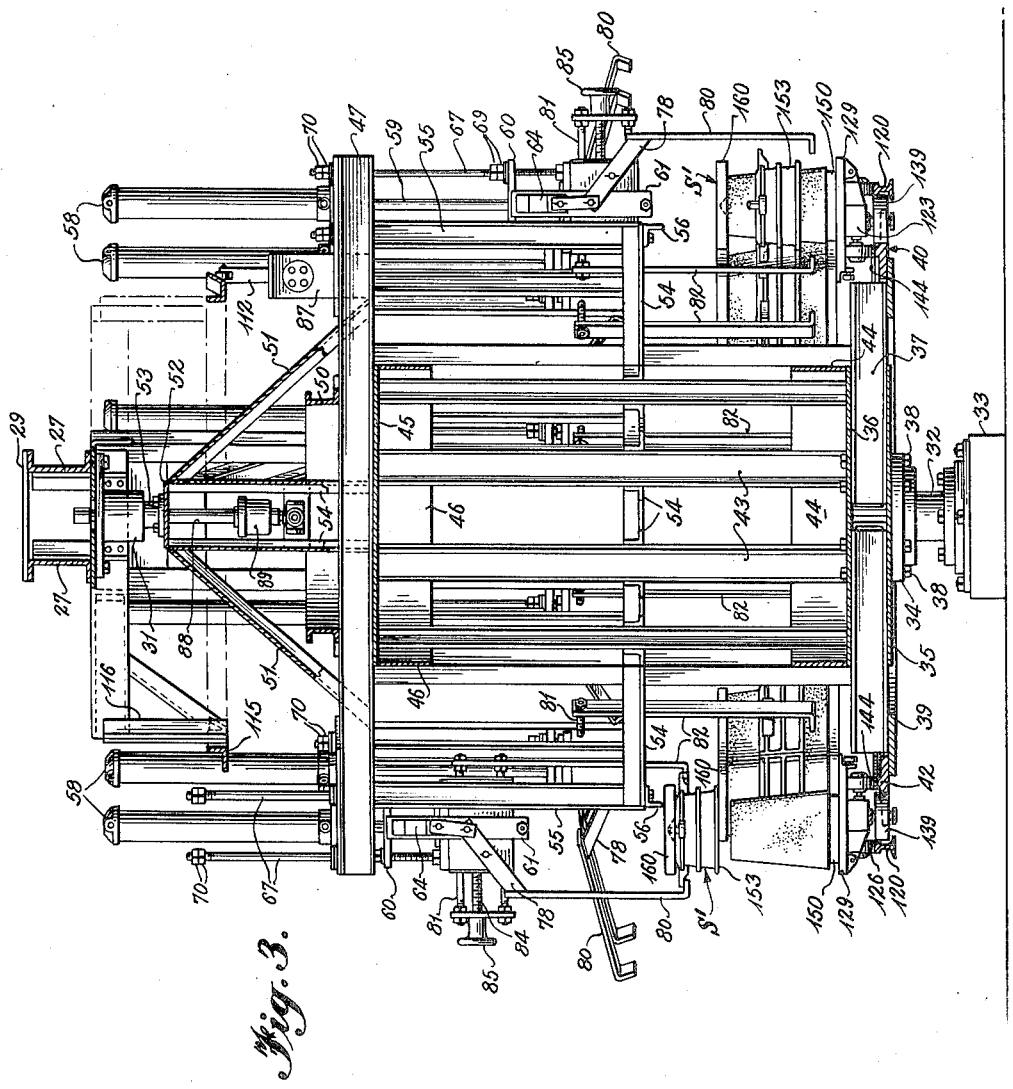

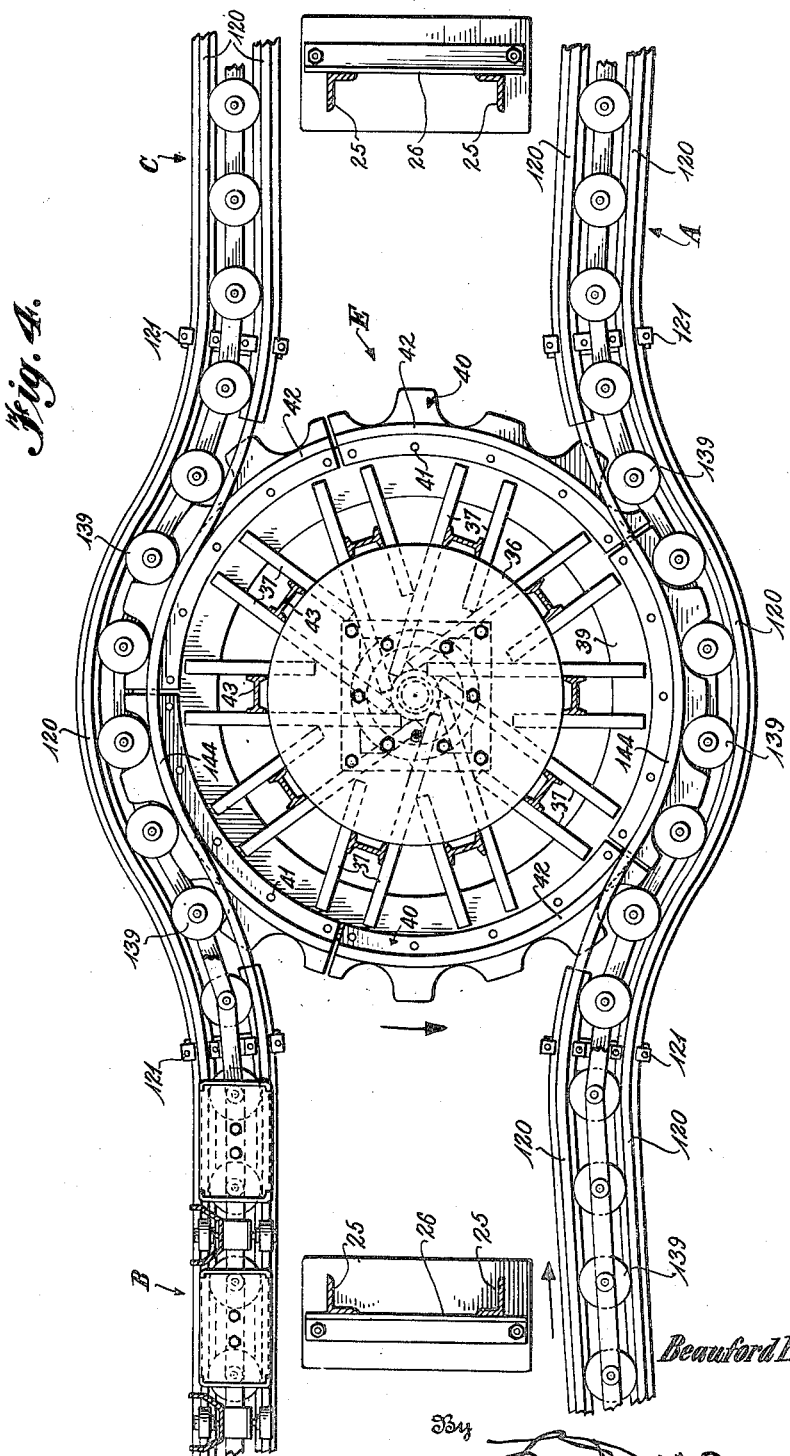

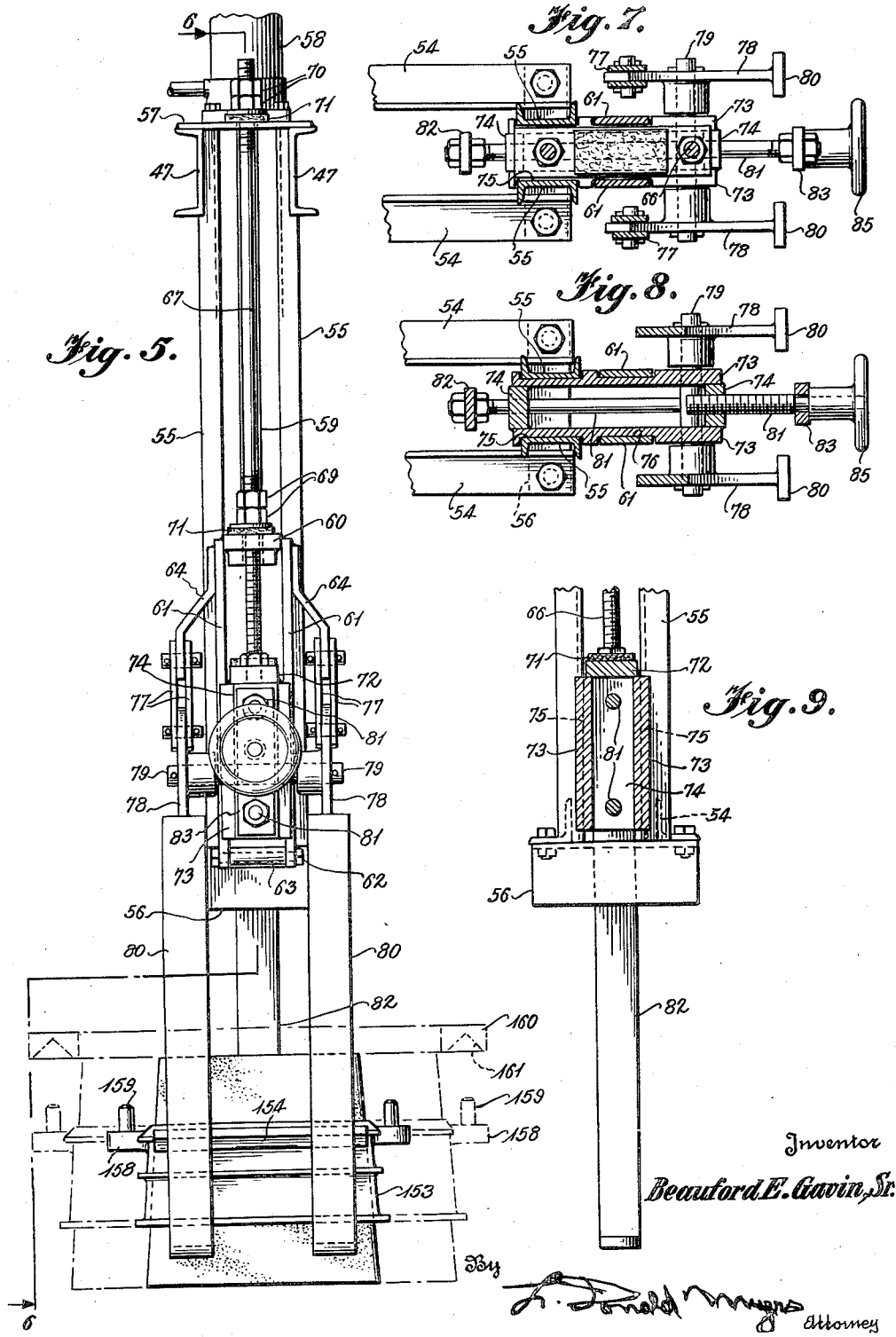

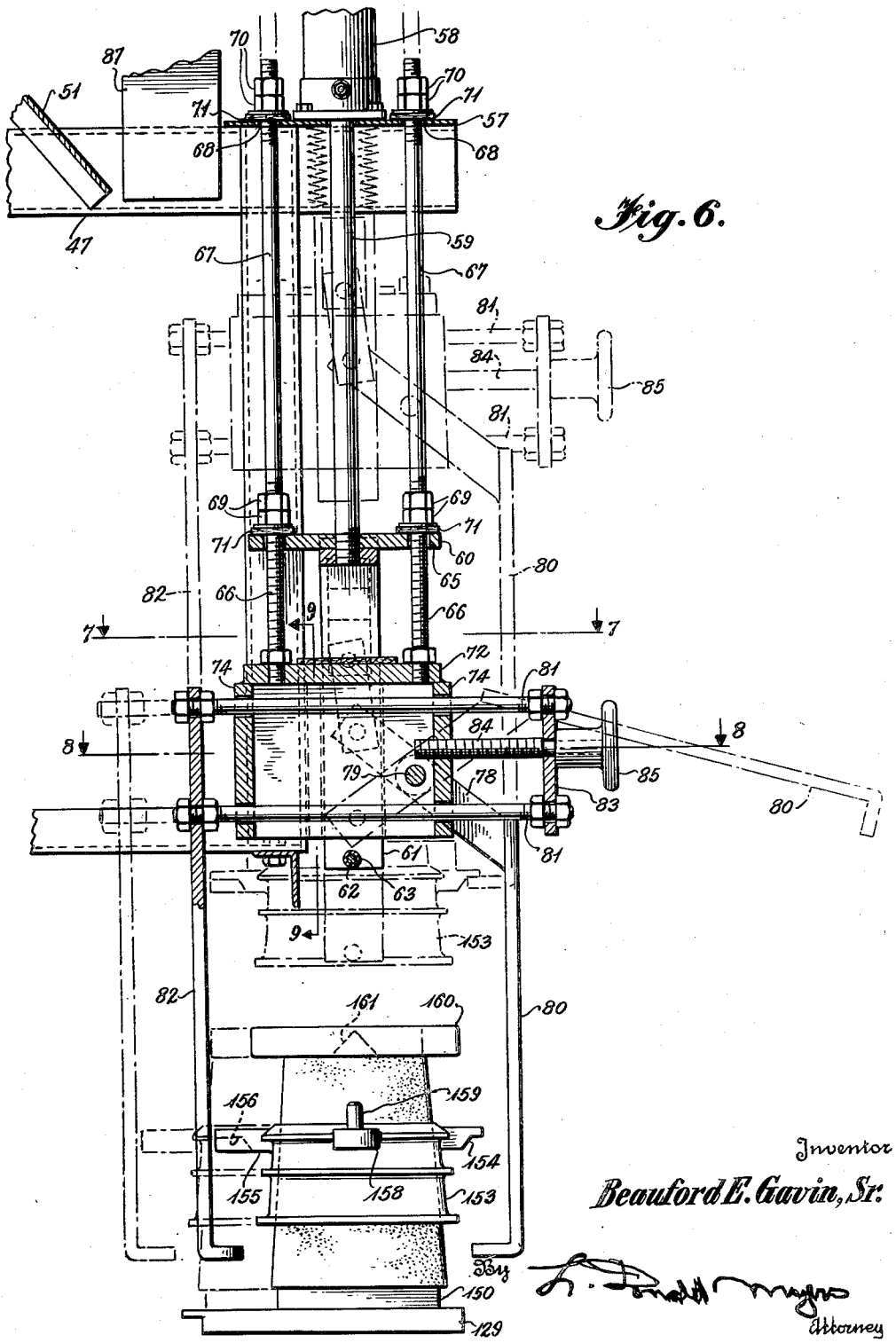

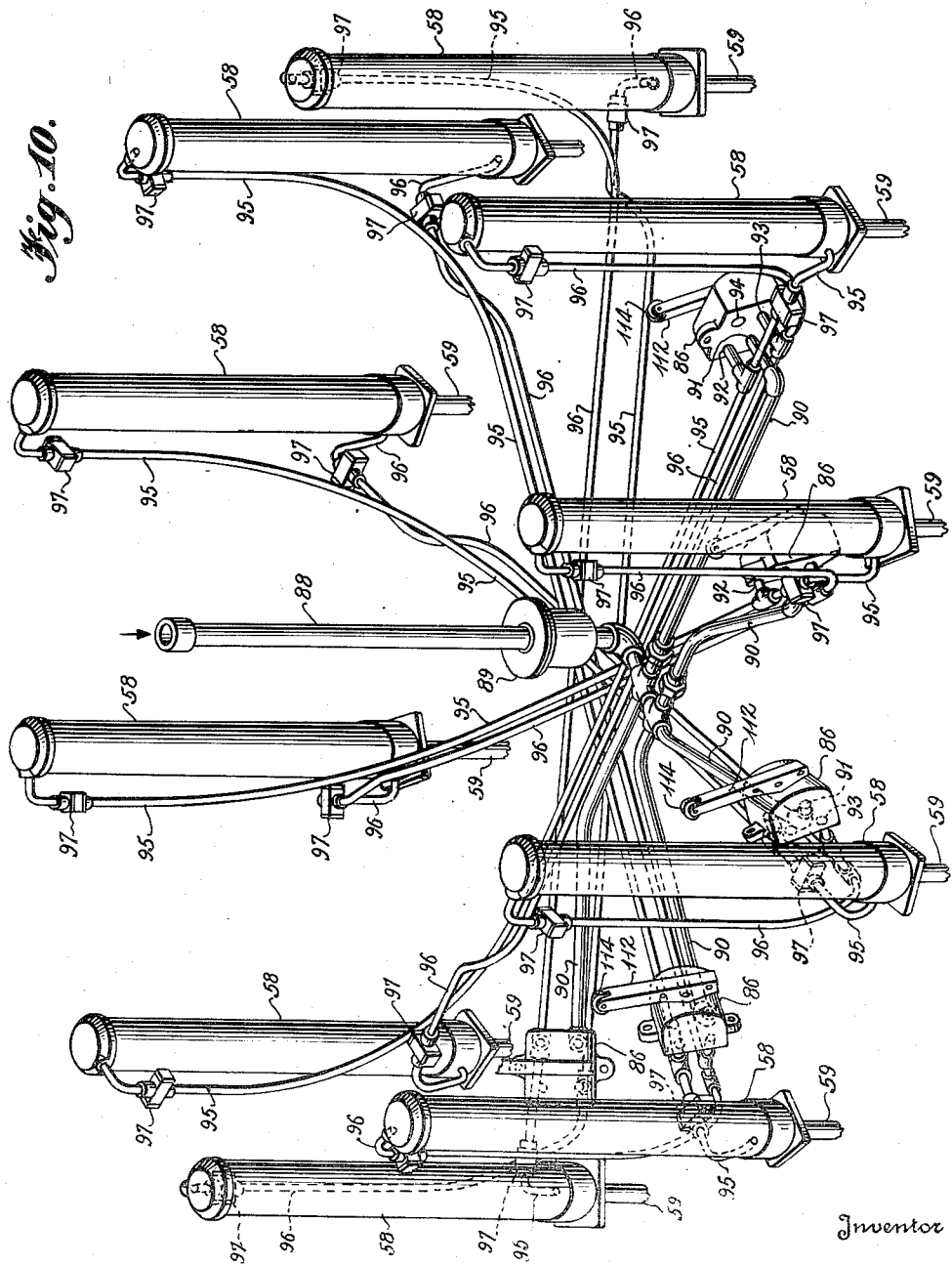

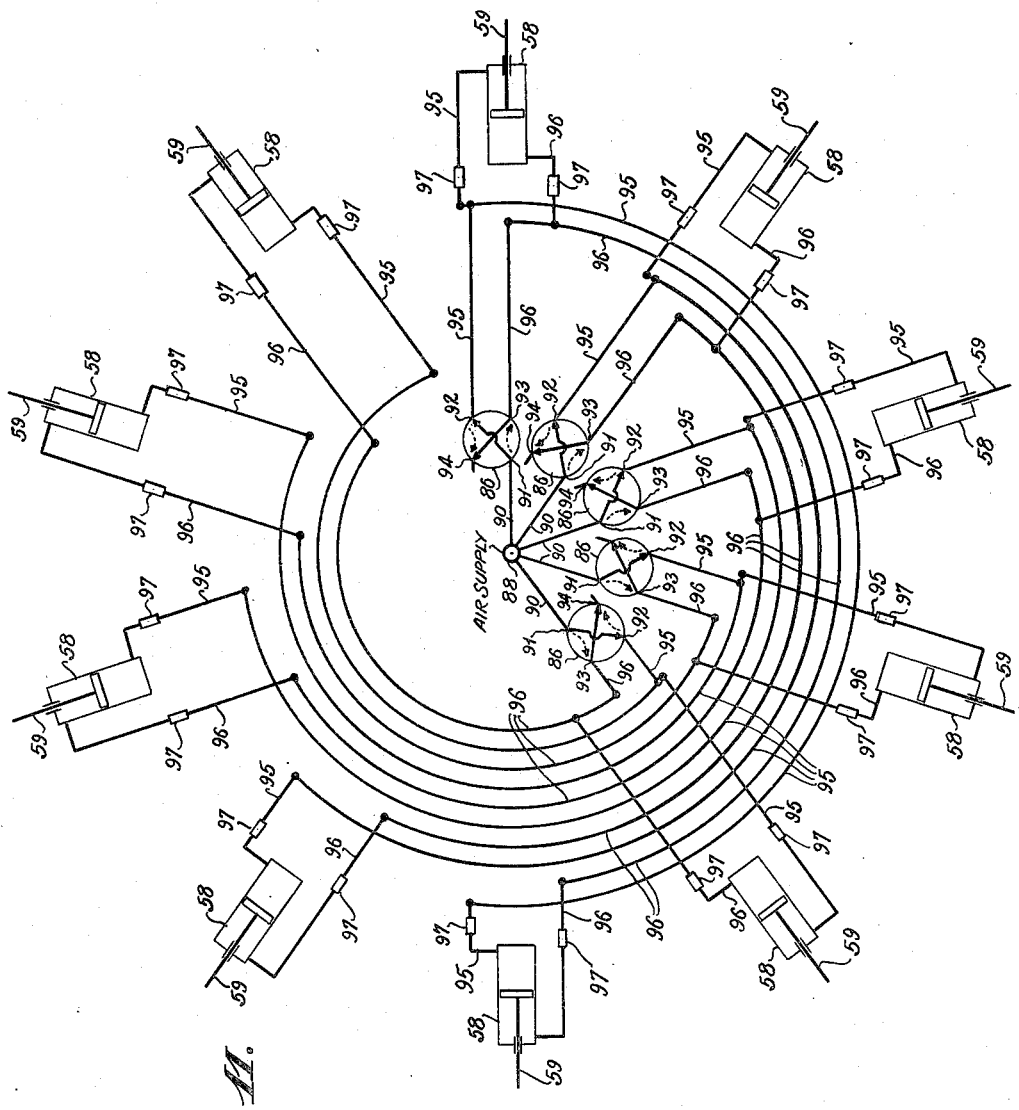

Nov. 13, 1951  B. E. GAVIN, SR  2,575,103
SNAP FLASK MOLD CONVEYER WITH AUTOMATIC
JACKET AND WEIGHT SHIFTER
Filed May 4, 1948  12 Sheets-Sheet 9
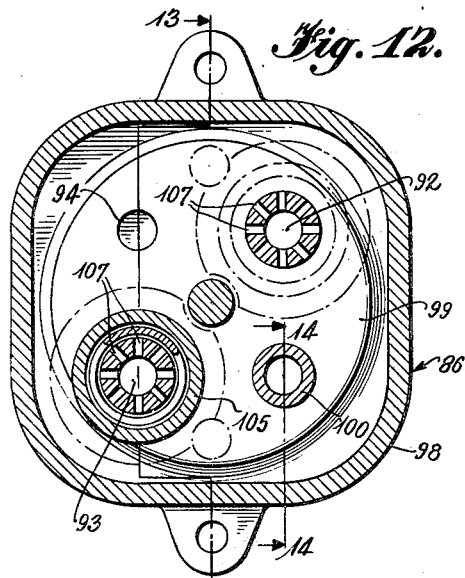
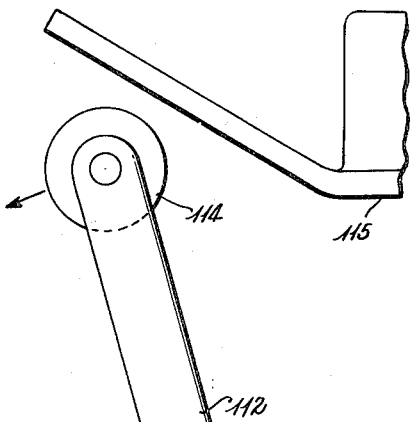
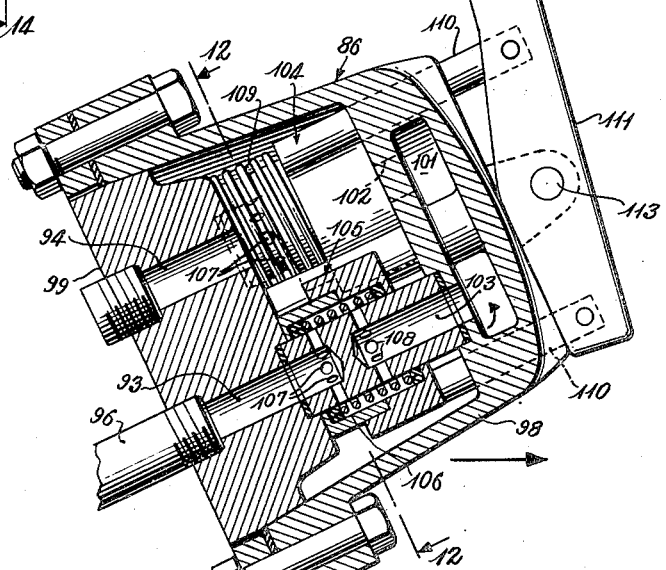
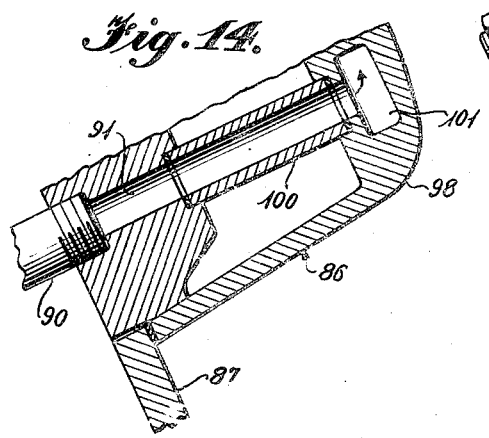
Inventor
Beauford E. Gavin, Sr
By L. Ronald Myino
Attorney Inventor
Beauford E. Gavin, Sr.
Attorney

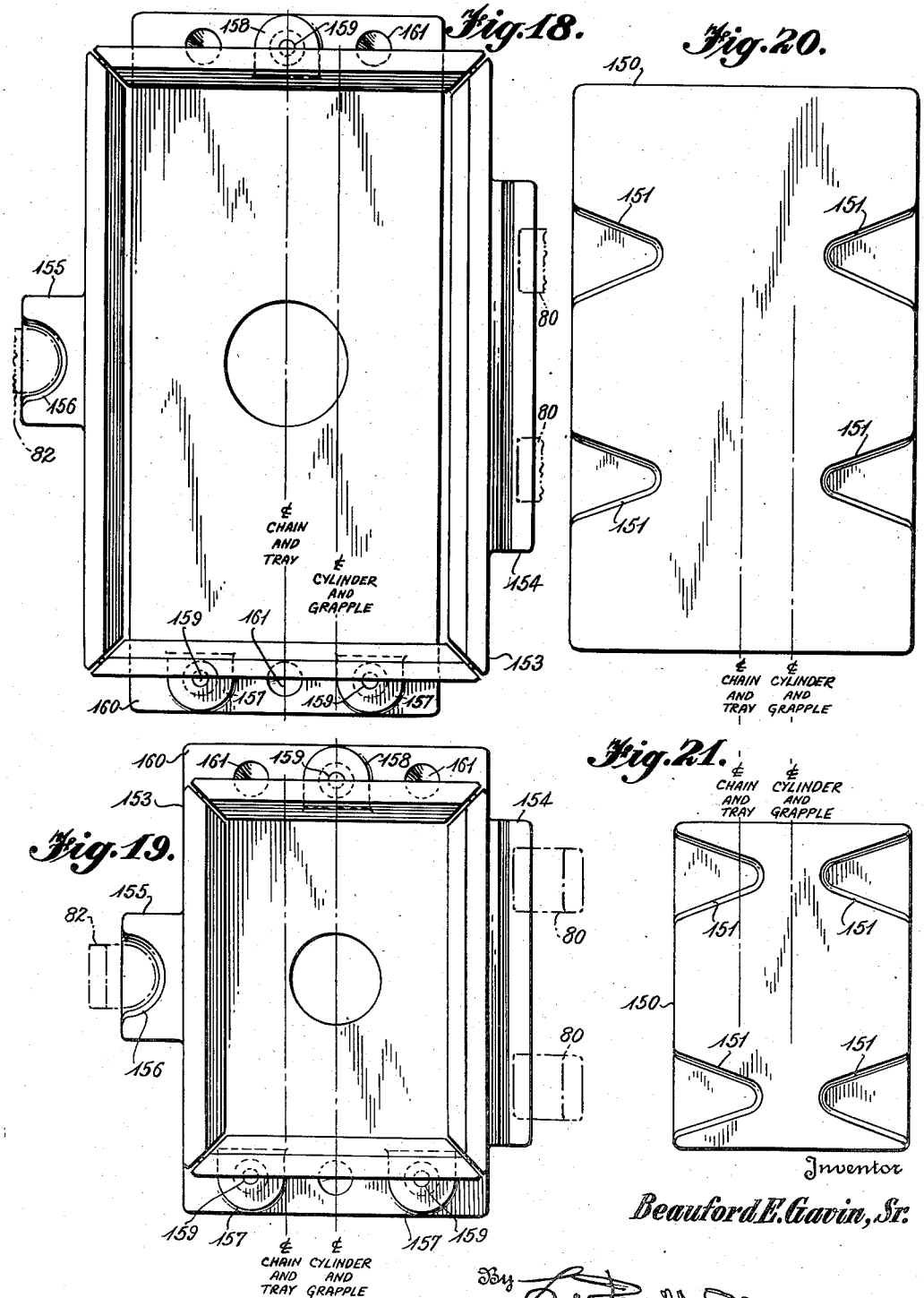

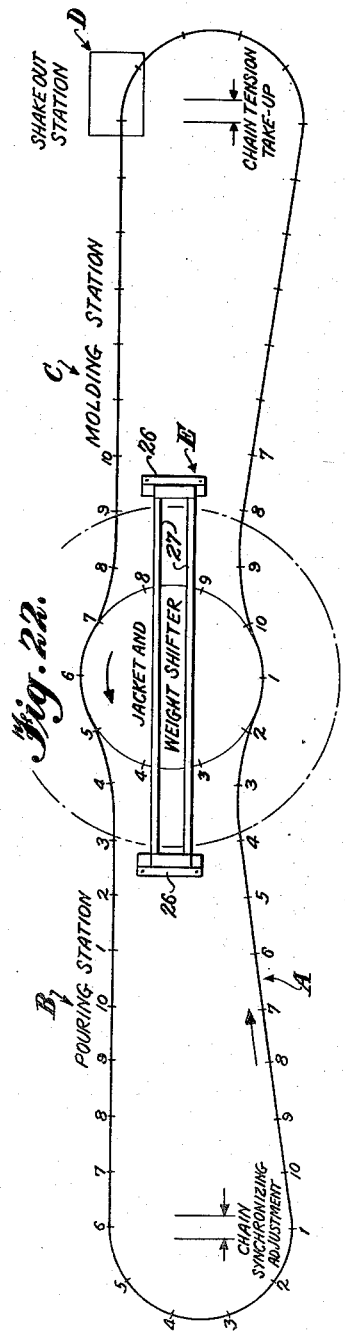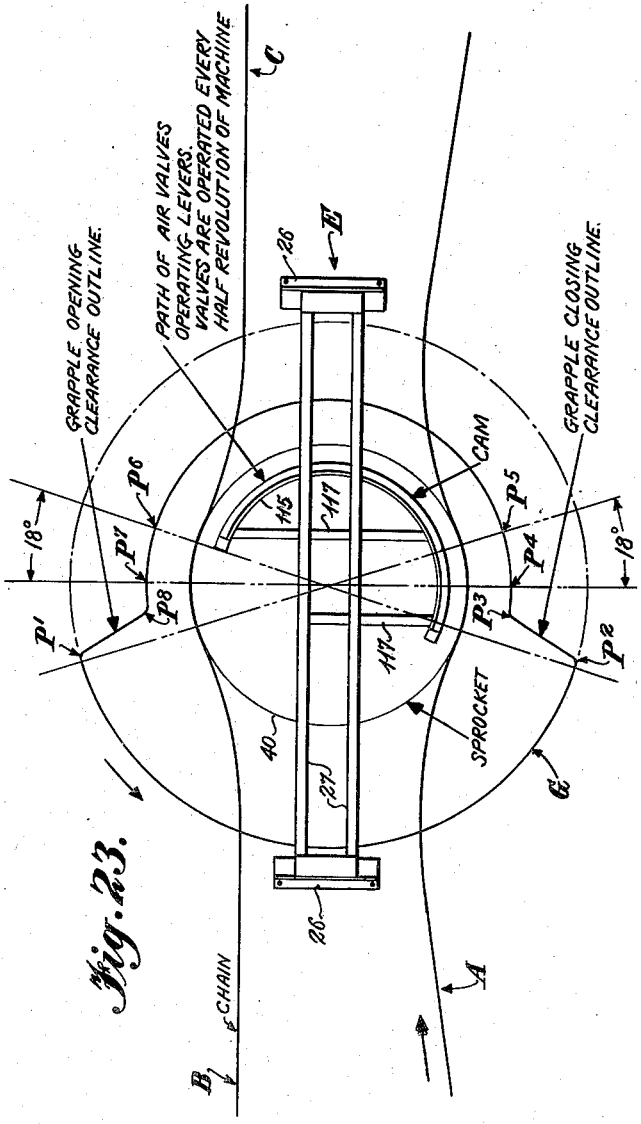

Patented Nov. 13, 1951

2,575,103

UNITED STATES PATENT OFFICE 2,575,103

SNAP FLASK MOLD CONVEYER WITH AUTOMATIC JACKET AND WEIGHT SHIFTER

Beauford E. Gavin, Sr., Indianapolis, Ind., assignor to National Malleable and Steel Castings Company, Cleveland, Ohio, a corporation of Ohio Application May 4, 1948, Serial No. 24,978

14 Claims. (Cl. 22—20)

This invention relates to snap flask mold conveyors with automatic jacket and weight shifters.

In the use of sand molds for producing the metal castings, it is the usual practice to employ a snap flask in making the molds and to replace the flasks with jackets during pouring to prevent the metal from bursting the molds. Before pouring the molds, weights are placed on the copes to hold them down against the lift of the molten metal.

When a conveyor is employed for handling the molds, the path of the conveyor extends past molding, pouring and shakeout stations. After they are produced, the molds, minus the snap flasks but supported by the bottom boards, are placed on the cars or trays of the conveyor. Jackets and weights of proper size are applied to the molds while they are being conveyed to the pouring station. After the castings have hardened sufficiently to relieve the molds of the pressure of the molten metal, the jackets and weights are removed. The molds, after passing through a suitable cooling zone, finally reach the shakeout station where they are discharged from the cars or trays onto suitable mechanism for effecting separation of the sand and castings.

From the above explanation, it will be appreciated each casting that is produced by the snap flask mold process requires a jacket and its weight to be separately handled several times.

For example, a jacket and weight of proper size first must be selected from their places of temporary or standby storage, carried to the mold conveyor and applied to the selected mold as it approaches the pouring station. Second, the jacket and weight must be removed from the mold at a proper location between the pouring and shakeout stations. Third, the removed jacket and weight must be carried back to said places of storage.

As each jacket weighs in the neighborhood of 60 pounds and each weight about 100 pounds, and as manual labor is employed for handling the jackets and weights, it will be appreciated that several men are required each working shift to perform this laborious operation.

It further will be appreciated that jobbing foundries of a size to justify the use of snap flask mold conveyors will be engaged each working shift in the production of different sized castings which will require the use of an equal number of different sizes of jackets and weights.

These jackets and weights must be kept in readiness for rapid selection and use within the space defined by the conveyor path to avoid production delay. This use of floor space inside the conveyor path, obviously, is another undesirable feature of this type of operation.

It is the primary object of this invention to provide a snap flask mold conveyor with an automatic jacket and weight shifter which will effect the saving of time and labor and the reducing of production costs in addition to lightening the burden of the foundrymen by eliminating a substantial amount of heavy manual labor.

A further important object of the invention is the provision of mechanism which will operate automatically to apply jackets and weights of proper sizes to the different sized molds as they are carried toward the pouring station, to remove the jackets and weights from the poured molds as they approach the shakeout station, and to transport the jackets and weights from their point of removal to their point of application, all in proper synchronism with the continuous travel of the cars or trays of the snap flask mold conveyor.

Still another important object of the invention is to provide jacket and weight shifter mechanism for a snap flask mold conveyor which will operate automatically to make use of empty conveyor cars or trays traveling to the pouring station as places of temporary or standby storage for jackets and weights with the result that floor space within the area defined by the conveyor path need not be used for this purpose.

Another primary object of the invention is the provision of jacket and weight shifter mechanism which is driven by the chain of the snap flask mold conveyor so the said mechanism will operate in perfect synchronism with the travel of the cars or trays of the conveyor to apply jackets and weights to the molds without damaging the latter.

A still further important object of the invention is to provide a jacket and weight shifter mechanism for snap flask mold conveyors which will handle jackets and weights of different sizes, and which will function to simultaneously apply both a jacket and its weight of proper size to each mold that is presented to the mechanism by the conveyor and to simultaneously remove both the jacket and its weight from each poured mold when the latter reaches the shifter mechanism.

A further object of the invention is the provision of a jacket and weight shifter mechanism for a snap flask mold conveyor in which the shifter mechanism takes the form of a turntable carrying a plurality of circumferentially spaced grapple units with each grapple unit automatically functioning, during each complete revolution of the turntable, to remove a jacket and its weight from a poured mold as it arrives at a given location while traveling along one run of the conveyor path, to carry the removed jacket and its weight to another run of the conveyor path, and to apply the jacket and weight to an unpoured mold as it arrives at a given location while traveling along said last mentioned run.

Another object of the invention is to provide a continuously traveling snap flask mold conveyor with a jacket and weight shifter continuously driven directly from the mold conveyor.

A still further object of the invention is the provision of a snap flask mold conveyor having an automatic jacket and weight shifter, the mold conveyor comprising a continuous series of wheeled cars or trays, each one of which is of special design to support and to uniformly position any one of a series of different sized bottom boards for snap flask molds so that all of the molds carried by the bottom boards will be properly positioned with reference to the jacket and weight shifter to permit jackets and weights to be applied to and removed from the molds without damage to the latter.

Another object of the invention is the provision of a special design of snap flask mold conveyor chain and a special design of drive sprocket for the turntable frame of the jacket and weight shifter so that the turntable will be driven in perfect synchronism with the mold conveyor.

Other objects and advantages of the invention will be apparent during the course of the following description.

Figure 2:
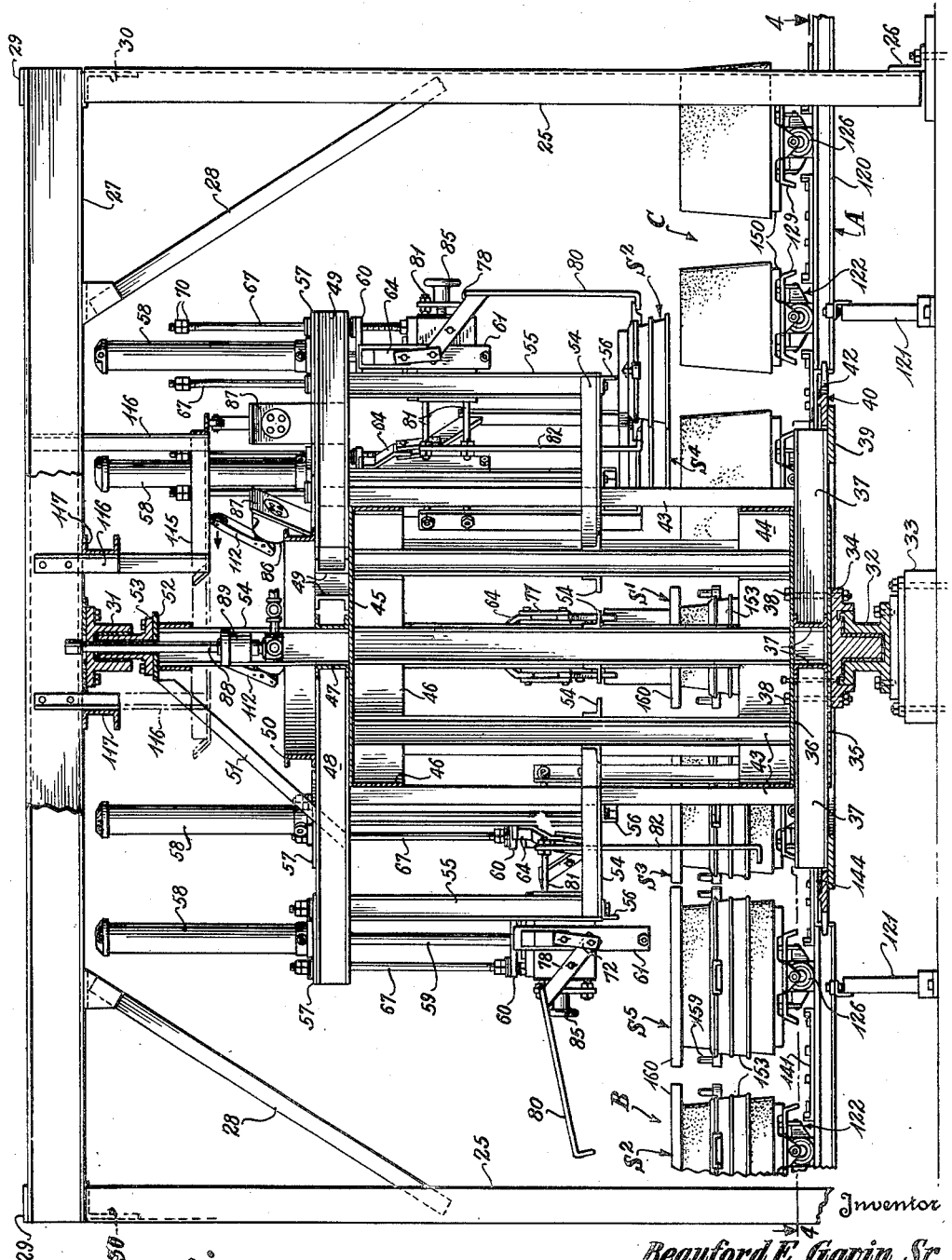
Figure 15:
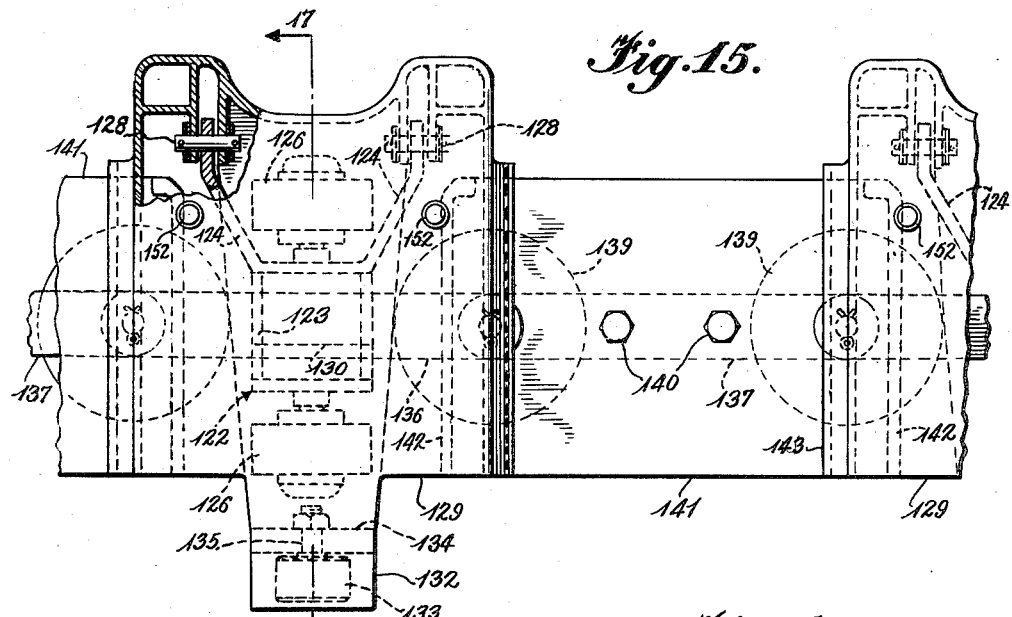
Figure 16:
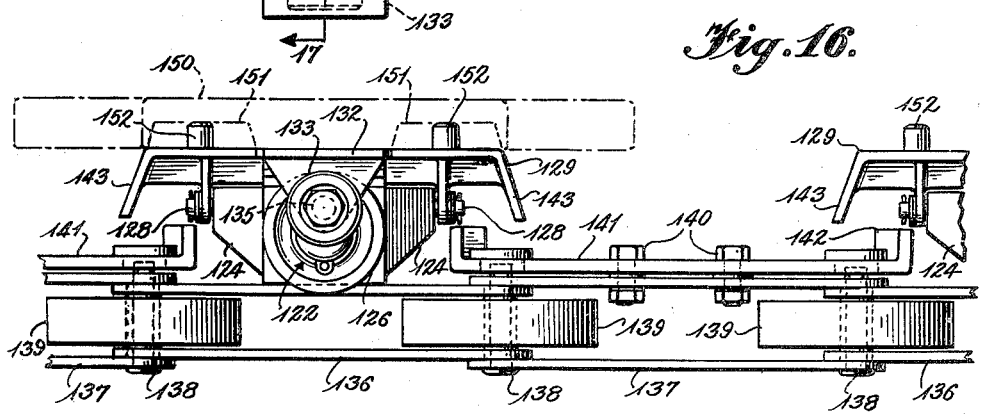
Figure 17:
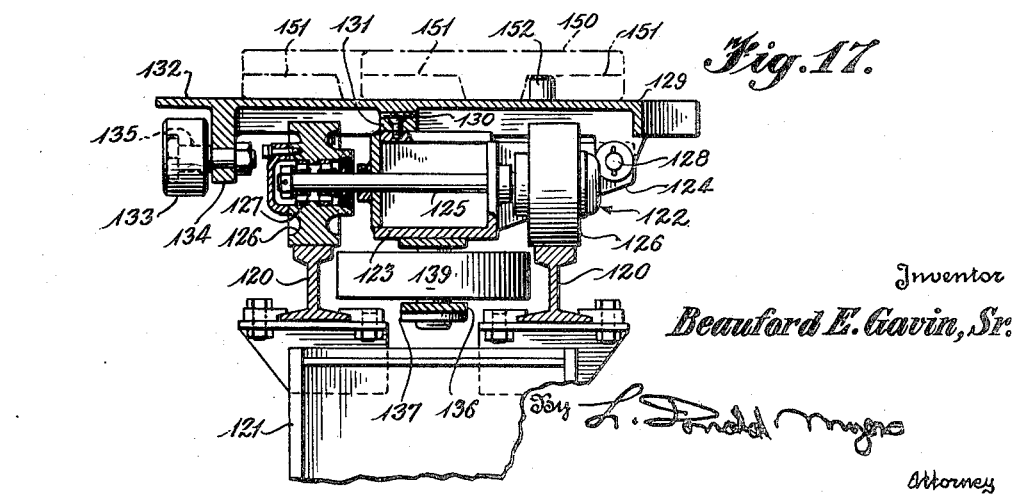

In the accompanying drawings forming a part of this specification and in which like numerals are employed to designate like parts throughout the same, Figure 1 is a top plan view of the automatic jacket and weight shifter and the immediately associated portion of the snap flask mold conveyor embodying this invention, Figure 2 is a vertical sectional view taken on line 2—2 of Fig. 1, Figure 3 is a vertical sectional view taken on line 3—3 of Fig. 1, Figure 4 is a horizontal sectional view taken on line 4—4 of Fig. 2, Figure 5 is a detail side elevational view of one of the grapple units that forms a part of the automatic jacket and weight shifter mechanism, Figure 6 is a vertical sectional view taken on lines 6—6 of Fig. 5, Figure 7 is a horizontal sectional view taken on line 7—7 of Fig. 6, Figure 8 is a horizontal sectional view taken on line 8—8 of Fig. 6, Figure 9 is a detail vertical sectional view taken on line 9—9 of Fig. 6, Figure 10 is a perspective view of the pressure fluid system employed for actuating the several grapple units of the automatic jacket and weight shifter mechanism, Figure 11 is a diagrammatic view of the pressure fluid system shown in detail in Fig. 10, Figure 12 is a transverse sectional view, taken on line 12—12 of Fig. 13, and illustrates a 4-way valve that is employed as a part of the pressure fluid system illustrated in Figs. 10 and 11, Figure 13 is a transverse sectional view taken on lines 13—13 of Fig. 12, Figure 14 is a fragmentary sectional view taken on line 14—14 of Fig. 12, Figure 15 is a fragmentary plan view of a short section of the snap flask mold conveyor embodying this invention, Figure 16 is an elevational view of the section of the snap flask mold conveyor illustrated in Fig. 15, Figure 17 is a vertical sectional view taken on line 17—17 of Fig. 15, Figure 18 is a bottom plan view of a mold jacket with its associated weight properly applied thereto, Figure 19 is a similar view to Fig. 18 but illustrates a smaller size of jacket and its associated weight, Figure 20 is a detail bottom plan view of the largest size of snap flask bottom board that can be used with the mold conveyor and automatic jacket and weight shifter embodying this invention, Figure 21 is a similar view to Fig. 20 but illustrates the minimum size of snap flask bottom board, Figure 22 is a diagrammatic view of the snap flask mold conveyor and jacket and weight shifter and illustrates the relationship that exists between the number of jacket and weight handling grapple units provided on the shifter mechanism and the number of mold carrying cars or trays incorporated in the snap flask mold conveyor, and Figure 23 is a diagrammatic view illustrating the opening and closing operations of the several grapple units that form a part of the automatic jacket and weight shifter mechanism.

In the drawings, wherein for the purpose of illustration is shown the preferred embodiment of this invention, and first particularly referring to Figs. 1 and 22, it will be noted this invention relates to a snap flask mold conveyor, designated in its entirety by the reference character A, which is made up of a series of wheeled cars or trays interconnected by a suitable drive chain. The snap flask mold conveyor is laid out in an endless path that is diagrammatically illustrated in Fig. 22 as serving a pouring station B, a molding station C and a shakeout station D. The remainder of the path of the snap flask mold conveyor, from the end of the pouring station B to the shakeout station D, is employed for cooling the poured castings.

The invention further includes a jacket and weight shifter mechanism E which cooperates with the opposite runs of the snap flask mold conveyor. By considering Fig. 22, it will be seen the jacket and weight shifter mechanism E cooperates with the run of the conveyor path that serves the pouring station B and the molding station C by being positioned between these two stations, and that the jacket and weight shifter mechanism E serves the other run of the conveyor path by being positioned at a suitable point or location relative to the cooling period for the poured castings.

As a brief explanation for the founding of metal castings by the snap flask mold method, it will be pointed out that the sand molds are first prepared at the molding station C by the use of snap flasks and separable bottom boards. As the molds are completed, they are placed on the cars of the conveyor A, minus the snap flasks which remain with the molders. The separable bottom boards are employed for handling the prepared sand molds.

Before pouring, it is necessary to enclose the molds in jackets to prevent the molten metal from bursting the molds. Also, to prevent the molten metal from lifting the cope off of the drag portion of the mold, it is necessary to apply a weight to the top of the mold. The jacket and weight shifter mechanism E functions to apply the jackets and weights to the molds while the latter are traveling from the molding station C to the pouring station B.

After the molds have been poured and have been carried a sufficient distance, or length of time, by the conveyor to allow the castings to set or harden sufficiently to relieve the molds of internal pressure created by the molten metal, the jackets and weights are removed by the automatic jacket and weight shifter mechanism E. This shifter mechanism, also, functions to transport the jackets and weights from their point of removal from poured molds to their point of application to unpoured molds.

After the jackets and weights have been removed from the poured molds, the snap flask mold conveyor carries the molds through the remainder of the cooling period to the shakeout station D where the molds are discharged from the conveyor cars or trays onto a suitable mechanism, such as a vibrating shakeout screen, which separates the sand from the castings. The bottom boards, usually, remain on the cars or trays of the snap flask mold conveyor when the molds and castings are discharged and are returned to the molders in this way.

The automatic jacket and weight shifter mechanism will be described first because it is more complicated than the snap flask mold conveyor.

By first referring to Figs. 1, 2 and 3, it will be seen that the automatic jacket and weight shifter mechanism includes a stationary frame formed by the end uprights 25 that are suitably anchored at their lower ends to the foundry floor by the angle members 26 and are suitably interconnected at their upper ends by the cross-beams 27. Corner braces 28 are suitably connected at their opposite ends to the uprights 25 and the cross-beams 27. It will be noted that two uprights 25 are provided at each end of the stationary frame and are arranged in spaced parallelism. Consequently, two cross-beams 27 are provided for connecting the upper ends of the two pairs of uprights 25. Cross-bracing plates 29 and angle members 30 are employed for interconnecting the two parallel parts of the stationary frame at the two upper corners.

At their middle portions, the two cross-beams 27 have suitably attached thereto the upper trunnion housing 31. In vertical, axial alignment with the upper trunnion housing is a lower trunnion housing 32 suitably attached to an elevated base 33 properly anchored to the foundry floor. These axially aligned trunnion housings function to rotatably support the turntable frame of the automatic jacket and weight shifter mechanism.

Fig. 2 specifically illustrates the pintle 34 as being journaled in the lower trunnion housing 32. The base portion of the turntable frame is best illustrated in Figs. 2, 3 and 4 as consisting of the lower and upper disc plates 35 and 36, respectively, which are spaced vertically from each other to accommodate the inner end portions of the ten pairs of channel irons 37. Fig. 4 best illustrates the specific manner in which these pairs of channel irons radiate from the axis of the turntable frame. The parallel plates 35 and 36, with their interposed pairs of channel irons 37, are fastened to the flange of the lower pintle 34 by a plurality of bolts and nuts 38.

At their outer end portions, the pairs of channel irons 37 have suitably attached to their lower faces the ring 39. The outside diameter of this ring is such that it projects radially outwardly beyond the outer extremities of the pairs of channel irons 37 to form an annular shelf that is employed for supporting the five sectors 40 of a large, toothed sprocket. Bolts, or the like, 41 are employed for securing the sprocket sectors to their supporting ring 39. Figs. 1 to 4, inclusive, illustrate the sprocket sectors 40 as each being provided with an arcuate rib 42 on its top surface. The ribs of all of the sprocket sectors collectively form an annular raised surface, the function of which will be described more in detail at a later point.

Each pair of channel irons 37 has positioned between and suitably secured to the same the lower end portion of a vertical I-beam 43. These I-beams engage the periphery of the upper disc plate 36. Figs. 2 and 3 disclose filler plates 44 as being suitably connected to the peripheral portion of the disc plate 36 and to the lower portions of the vertical I-beams 43.

Figs. 1, 2 and 3 disclose a top disc plate 45 as being suitably connected at its peripheral edge to the upper end portions of the vertical I-beams 43. Filler plates 46 are suitably attached to and depend from the peripheral portion of the top disc plate 45 for bridging the spaces between and for bracing the upper end portions of the vertical I-beams 43.

By considering Figs. 1 and 3, it will be seen that a pair of parallel channel irons 47 are supported on the top disc plate 45 and extend entirely across the turntable frame to project at their outer end portions beyond the periphery of the sprocket that is formed on the base portion of the turntable frame by the five sectors 40.

Figs. 1 and 2 illustrate two additional pairs of parallel channel irons 48 that project radially of the axis of the turntable frame at diametrically opposite points. The inner end portions of these two pairs of channel irons 48 are supported on the top disc plate 45 and bear at their inner extremities against the outer sides of the two channel irons 47. Six additional pairs of parallel channel irons 49 are supported at their inner end portions on the top disc plate 45 and are arranged radially of the axis of the turntable frame. It will be seen by inspecting Fig. 1 that there are all told ten pairs of radially projecting arms formed by the several channel irons 47, 48 and 49 and that the outer end portions of each one of these pairs of arms project radially outwardly beyond the periphery of the sprocket formed by the several sectors 40.

A flanged ring 50 is suitably fastened to the top faces of all of the pairs of channel irons 47, 48 and 49 for the purpose of tying them together.

Four upwardly converging channel irons 51 are connected at their upper, adjacent ends to a top plate 52 and at the lower ends to the pairs of channel irons 47 and 48 to form a spider for supporting the pintle 53 that is journaled in the top trunnion housing 31. To further brace the apex of this top pintle supporting spider, two parallel, vertical channel irons 54 are provided. The upper ends of these last mentioned channel irons are attached to the top plate 52 while the lower ends are positioned between and suitably attached to the pair of channel irons 47.

It now will be seen that a complete turntable frame has been described and this frame is supported for rotation about a vertical axis by upper and lower trunnion and pintle assemblies.

It will be remembered that the pairs of channel irons 47, 48 and 49 were described as forming ten pairs of radially projecting arms and that each pair of projecting arms is provided with a vertical I-beam 43. Ten mounting frames for grapple units are completed by attaching to the ten I-beams 43 and to the ten pairs of radial arms the ten pairs of horizontally, radially arranged angle irons 54 and the ten pairs of perpendicular channel irons 55. In other words, each pair of angle irons 54 have their inner ends suitably fastened to the opposite side flanges of a vertical I-beam 43 and their outer end portions attached to the lower ends of a pair of vertical channel irons 55. The upper ends of these channel irons are suitably fastened to the overlying pair of radial arms formed by the horizontally arranged pairs of channel irons 47, 48 and 49. Transverse angle braces 56 interconnect the outer, lower corners of the mounting frames that are formed by the points of interconnection of the pairs of horizontal angle irons 54 and the pairs of vertical channel irons 55.

By inspecting Figs. 1 to 3, inclusive, 5 and 6, it will be seen that the outer end portions of each pair of radial arms, formed by the pairs of channel irons 47, 48 and 49, have mounted thereon a plate 57 which is employed for supporting a double-acting, pressure fluid piston and cylinder unit 58. These piston and cylinder units extend perpendicularly and have their piston rods 59 arranged to extend downwardly between the associated pairs of radial arms.

By referring particularly to Figs. 2, 3 and 6, it will be seen that the lower extremity of each piston rod 59 has rigidly fastened thereto a yoke 60. This yoke has depending from its opposite sides the two parallel guide bars 61 which are illustrated as being connected at their lower ends by the bolt 62 and the spacer sleeve 63. Fig. 5 best illustrates the guide bars 61 as having suitably fastened to the outer faces of their upper end portions the offset mounting lugs 64.

Fig. 6 best illustrates the opposite end portions of each yoke 60 as being provided with smooth bored holes 65 for loosely receiving the threaded portions 66 of the two parallel guide rods 67 that extend perpendicularly for passing through the smooth bored holes 68 formed in the cylinder and piston supporting plate 57. The threaded portion 66 of each one of the guide rods 67 has adjustably threaded thereon the pair of lock-nuts 69. These adjustable lock-nuts function as stops for the upward movement of the piston rod actuated yoke 60 relative to the guide rods 57.

The upper threaded ends of the guide rods 67 have adjustably mounted thereon the pairs of lock-nuts 70 which function to limit the downward movement of the guide rods relative to the top plate 57. Suitable cushioning washers 71 are interposed between the opposite end portions of the yoke 60 and the guide rod carried lock-nuts 69 and between the top plate 57 and the pairs of guide rod carried lock-nuts 70 to absorb impact shocks.

The lower ends of the guide rods 67 are threadedly connected to the top plate 72 of a fabricated, box-like slide that additionally includes the parallel side plates 73 and the parallel end plates 74.

By inspecting Figs. 7 and 8, it will be seen that the side plates 73 of the box-like slide are provided with vertical grooves 75 to receive the parallel channel irons 55 which form a part of the previously described grapple unit mounting frame. In other words, these parallel channel irons 55 act as guides for the vertical movements of the box-like slide. The side walls 73, additionally, are provided with vertical grooves 76 to receive the guide bars 61 that were described as being attached at their upper ends to the yoke 60. It will be apparent, therefore, that the box-like slide is permitted to move lengthwise of the parallel guide bars 61 and to be limited in its relative movement in one direction by the spacer sleeve 63 and in the other direction by the yoke 60.

Figs. 2, 3, 5 and 6 best illustrate the offset lugs 64 as having pivotally connected to their lower ends the pairs of links 77 which in turn are connected at their outer ends to the lever arms 78 pivotally mounted on the box-like slide by the transverse pin 79. These same figures disclose the outer ends of the lever arms 78 as having rigidly fastened thereto the two grapple arms 80.

Figs. 5 to 8, inclusive, best illustrate the end walls 74 of the box-like slide as having horizontally movable therethrough the two supporting rods 81 which have fastened to their inner end portions the single grapple arm 82. A plate 83 is fastened to the outer ends of the two parallel supporting rods 81. An adjusting screw 84 is shouldered at its outer end portion to bear against the supporting rod connecting plate 83 while an operating knob 85 is fastened to the reduced end of the screw 84 for clamping the plate 83 against the shoulder of said screw. The threaded portion of the screw 84 is threadedly connected to the outer end wall 74 of the box-like slide.

It will be apparent, therefore, that by rotating the operating knob 85, the supporting rods 81 may be moved longitudinally relative to the box-like slide for adjusting the setting or position of the inner grapple arm 82. This grapple arm can be adjusted between the limits illustrated by the solid line and the broken line positions of Fig. 6. This adjustment is desirable to accommodate mold jackets and weights of different widths.

The operation of each one of the ten grapple units can best be described by specifically referring to the disclosure of Fig. 6.

It will be understood that the inner grapple arm 82 is set or adjusted to a proper position to handle a given sized jacket and weight and is left in that adjusted position until its grapple unit is required to handle a different sized jacket and weight. It will be considered, therefore, that the grapple arm 82 is set in its solid line position of Fig. 6 for handling the smallest size of mold jacket and its weight.

Fig. 6 illustrates a solid line position for the two grapple arms 80, a broken line position for these arms in which they are swung outwardly, and a broken line position for the grapple arms 80 raised above the solid line position. It will be noted that the single grapple arm 82, also, is illustrated in a broken line, elevated position in parallelism with the last mentioned broken line position of the two grapple arms 80.

The grapple arms 80 and 82 occupy their solid line positions when the guide rods 67 are supported on the top plate 57 and the piston rod 59 is positioned with its yoke 60 engaging the cushion members 71 for the lock-nuts 69. Further outward movement of the piston rod 59 relative to the cylinder and piston unit 58 causes the yoke 60 to move downwardly away from the lock-nuts 69. This downward movement is relative to the guide rods 67 and the box-like slide that is supported by the guide rods. Downward movement of the yoke 60 can continue until it engages and is stopped by the box-like slide. This downward movement of the yoke 60 causes the grapple arms 80 to swing outwardly into their angularly arranged, broken line position as a result of the connections that are established between the yoke 60 and the inner ends of the lever arms 78 by the offset lugs 64 and the pairs of links 77.

When the set of grapple arms 80 and 82 are to be actuated to seize and lift a mold jacket and its weight, pressure fluid is admitted to the lower end of the cylinder and piston unit 58 to bring about retraction of its piston rod 59. Upward movement of the piston rod first causes the grapple arms 80 to swing into their solid line position. This movement of the grapple arms 80 is effected by upward movement of the yoke 60 relative to the stationary guide rods 67 until the yoke engages the cushion members 71 backed up by the pairs of lock-nuts 69.

Further retracting movement of the piston rod 59 causes the yoke 60 to raise the guide rods 67 and the box-like slide attached to the lower ends of these rods. This lifting of the box-like slide, causes the grapple arms 80 and 82 to move upwardly from their solid line positions to their upper, broken line positions. This upper movement of the set of grapple arms lifts the mold jacket and its weight off of the mold.

When the lifted jacket and weight are to be placed on another mold, the application of pressure fluid to the cylinder and piston unit is reversed; i. e., pressure fluid is admitted to the upper end of the cylinder and is exhausted from the lower end. This aplication of fluid pressure brings about downward movement of the piston rod 59 with the guide rods 67 and the box-like slide supported on the yoke 60 until the cushion members 71, supported by the top plate 57, are engaged by the pairs of lock-nuts 70. This engagement stops the downward movement of the guide rods 67 and the box-like slide. Further downward movement of the piston rod 59 causes the yoke 60 to move downwardly over the threaded portions 66 of the guide rods 67 and brings about outward swinging movement of the grapple arms 80.

It will be seen the lock-nuts 70 can be adjusted on the upper ends of the guide rods 67 to raise or lower the lower ends of the grapple arms 80 and 82 when they are in their solid line positions. The lower ends of the grapple arms should be so positioned that they will properly handle mold jackets and their weights when the jackets are placed directly on the conveyor cars; that is, without either molds or bottom boards being present. It, also, will be seen the lock-nuts 69 can be adjusted along the threaded portions 66 of the guide rods 67 to vary the extent to which the grapple arms 80 will be swung outwardly.

As has been noted above, there are ten grapple units carried by the turntable frame in circumferentially spaced relation. It is to be understood that the invention is not limited to this exact number of grapple units because a greater or lesser number very readily can be employed. The only restriction that should be noted is that there should be an even number of grapple units so they can be arranged in diametrically opposite pairs. It is desirable to have the grapple units arranged in diametrically opposite pairs so one unit of each pair can be seizing and lifting a jacket and its weight at the same time the other grapple unit of the pair is lowering and releasing a jacket and its weight.

One form of actuating and controlling system for effecting the above type of operation of all of the grapple units now will be described.

It was noted above that each grapple unit is provided with a double-acting pressure fluid cylinder and piston unit 58. The ten cylinder and piston units are illustrated in perspective in Fig. 10 and diagrammatically in Fig. 11. Figs. 1, 2 and 3 illustrate the ten cylinder and piston units 58 assembled on the turntable frame of the automatic jacket and weight shifter mechanism.

Because the diametrically opposite grapple units are to be operated in the reverse order; i. e., one grapple unit operating to seize and lift a jacket and its weight while the diametrically opposite grapple unit is operating to lower and release a jacket and its weight, it is only necessary to employ five 4-way valves 86 to effect this type of control. These valves are illustrated in Figs. 1, 2 and 3 as being mounted on angle bracket 87 attached to the associated pairs of radial arms that are formed by the pairs of channel members 47, 48 and 49. It will be noted by considering these several figures that the five valves 86 are positioned adjacent five of the cylinder and piston units 58.

Pressure fluid, obtained from a suitable source of supply, not shown, preferably at a pressure of from 75 to 80 pounds per square inch, is delivered to the stationary, main feed pipe 88 illustrated in Figs. 2 and 3 as extending downwardly through the stationary, upper trunnion housing 31 and through the bore of the upper, rotatable pintle 53 for connection with a suitable rotary pressure joint 89. The lower, rotatable portion of this pressure joint 89 is connected by suitable coupling members and nipples to the five branch feed lines 90 that extend to and are connected with the inlet ports 91 of the five valves 86.

Each one of the valves has two outlet ports that are identified by the reference characters 92 and 93, and one exhaust port 94. Each valve outlet 92 has piping 95 connected thereto that extends to and is connected with the lower end of the cylinder and piston unit 58 that is positioned adjacent that valve 86, and that also extends to and is connected with the upper end of the piston and cylinder unit 58 that is positioned diametrically opposite the first mentioned cylinder and piston unit. The outlet 93 of each valve is connected by suitable piping 96 to the upper end of the piston and cylinder unit 58 that is positioned adjacent that valve and extends to and is connected with the lower end of the piston and cylinder unit that is positioned diametrically opposite the first mentioned cylinder and piston unit.

Each delivery piping 95 and 96 has connected in the same, relatively close to its point of connection with the end of a cylinder and piston unit, what is commercially known as a speed control valve 97. These valves are 1-way acting in that they can be set to control the rate of flow of the pressure fluid in one direction while permitting full capacity flow of the pressure fluid in the opposite direction. All of the speed control valves 97 are set or adjusted for a predetermined, reduced rate of flow toward the adjacent ends of their cylinder and piston units 58 while permitting full or unreduced flow away from their cylinder and piston units. By operating in this way, it is possible to regulate the speed of travel of the pistons for the units 58 in both of their directions of movement.

The detail construction of each one of the 4-way valves 86 is disclosed in and will be described in connection with Figs. 12 to 14, inclusive.

This valve includes a main casing portion 98 that is closed at its outer end and is provided with a cover plate 99 at its inner end. This cover plate is formed with the pressure fluid inlet port 91 that is connected to the branch delivery pipe 90. A duct 100 delivers the pressure fluid from the inlet port 91 to the distribution chamber 101 that is formed in the closed end portion of the main casing 98. The interior of the main casing portion 98 is hollow and is in open communication with the exhaust port 94 that opens to the atmosphere.

The distribution chamber 101 is in open communication with two ducts 102 and 103 for supplying pressure fluid to the two reciprocating valve sleeves 104 and 105, respectively. The construction of both of these valve sleeves is the same and for that reason a detail description of sleeve 105 and its associated parts will suffice for both.

The valve sleeve 105 is illustrated in Fig. 13 as having an enlarged bore 106 for establishing communication between the radial ports 107 and 108 when the sleeve is in the position illustrated in Figs. 12 and 13. The radial ports 107 communicate with the delivery duct 93 while the radial ports 108 communicate with the duct 103. When considering the sleeve valve 104, the radial ports 107 communicate with the duct 92 while the radial ports 108 communicate with the duct 102. It will be appreciated, therefore, that when either of the valve sleeves 104 or 105 is in the position of valve sleeve 105 in Fig. 13, pressure fluid will be delivered from the distribution chamber 101 through the duct 102 or 103 and the ports 108 into the bore 106 of the valve sleeve and from this bore through the the ports 107 into the duct 92 or 93, depending upon which valve sleeve is being considered, for delivering the pressure fluid to either the piping 95 or the piping 96.

Fig. 13 illustrates valve sleeve 104 oppositely positioned to the position shown for valve sleeve 105. When either one of the valve sleeves is in the position of sleeve 104 in Fig. 13, the radial ports 107 are uncovered so they communicate with the hollow interior of the valve casing part 98 with the result the duct 92 or 93, depending upon the valve sleeve being considered, will be placed in communication with the exhaust duct 94. Spring 109 is associated with valve sleeve 104 only and functions to normally position both valve sleeves as shown in Fig. 13.

The reciprocating valve sleeves 104 and 105 are connected to the operating rods 110. The outer ends of these operating rods are pivotally connected to the rockable head 111 of the actuating lever 112 that is pivotally mounted at 113 on the valve casing part 98. The actuating lever 112 is provided with a roller 114 at its outer end which is adapted to engage the arcuate cam rail 115.

This arcuate cam rail 115 is illustrated in Figs. 1, 2 and 3 as extending slightly over 180° around the turntable frame and as being supported by the depending arms 116 which are attached at their upper ends to the channel irons 117 supported by the cross beams 27 of the stationary frame. In other words, the arcuate cam rail 115 is stationary and is positioned as illustrated in Fig. 1.

By considering Fig. 13, it will be seen that when the actuating lever 112 of a valve 86 does not have its roller 114 engaging the arcuate cam rail 115, the spring 109, positioned within the valve housing and operatively associated with the sleeve valve 104, will function to position the valve operating lever 112 as illustrated.

When the roller 114 of a valve actuating lever 112 engages the cam rail 115, the condition of the associated valve 86 will be reversed to that illustrated in Fig. 13. That is to say, the valve sleeve 104 will be depressed against the force of the spring 109 and the valve sleeve 105 will be moved outwardly. When the roller 114 of the valve actuating lever 112 again runs off of the cam rail 115, the spring 109 will return the valve to the condition illustrated in Fig. 13.

By considering Figs. 11 and 13, it will be seen that when a valve lever 112 is in the position illustrated in Fig. 13, the valve will be conditioned to bring about pressure fluid flow in the direction indicated by the broken arrow lines applied to each valve in Fig. 11. That is to say, fluid will flow from the delivery branch line 90 to the inlet port 91 of the valve and through the valve sleeve 105 to the delivery port 93. From this port the pressure fluid will flow through the piping 96 to the upper end of the cylinder and piston unit positioned adjacent the valve 86 being discussed, and also through the piping 96 to the lower end of the cylinder and piston unit that is positioned diametrically opposite the first referred to cylinder and piston unit. With the pressure fluid flowing through each valve 86 in the direction indicated by the broken arrow lines of Fig. 11, the cylinder and piston unit 58 closely positioned to the valve in question will have its space below the piston exhausted through the piping 95 while the cylinder and piston unit positioned diametrically opposite the first mentioned cylinder and piston unit will have the space above its piston exhausted through the piping 95. The exhausted pressure fluid will flow into the valve 86 through the port 92 and out of the valve through the exhaust port 94.

The snap flask mold conveyor cooperating with the automatic jacket and weight shifter mechanism that has just been described in detail best can be understood by specifically referring to Figs. 15 to 17, inclusive, along with Figs. 1 to 4, inclusive.

The general path of the mold conveyor is illustrated diagrammatically in Fig. 22. This path is defined by the parallel track rails 120 which are supported at a proper elevation and at suitably spaced intervals by the legs 121. A desired number of two-wheeled car trucks 122 are supported on the rails 120, at suitably spaced intervals, for travel therealong.

Each one of these trucks is illustrated in Figs. 15 to 17, inclusive, as including a main, fabricated frame 123 which is of box-like construction and is provided with two laterally projecting mounting arms 124. A non-rotatable, transverse shaft 125 passes through each frame 123 and functions to rotatably support the truck wheels 126 on its opposite end portions by means of the antifriction bearing units 127. As is clearly illustrated in Fig. 17, the wheels 126 are properly spaced from each other to rest upon the treads of the parallel tracks 120.

The laterally projecting truck frame arms 124 are employed for pivotally connecting, by means of the pins 128, a car top or tray 129 to the truck. This pivoted car top or tray is further supported on the truck frame 123 by means of the cooperating or registering rib 130, carried by the car top 129, and the plate 131, carried by the truck frame 123.

The free end of the pivoted truck top 129 is provided with a lateral projection 132 employed for supporting a roller 133 through the medium of the depending lug 134 and the pin 135. This roller 133 is employed to elevate the car top 129, about the pivot pins 128, to effect dumping of the sand mold and its casting at the shakeout station D, see Fig. 22. This tilting or elevating of the car top 129 is accomplished by the engagement of the roller 133 with a suitably shaped cam, not shown, that is positioned at the said shakeout station.

By particularly considering Figs. 16 and 17, it will be seen that each truck frame 123 is welded, or otherwise suitably connected, to the upper side bar of each one of the inside links 136 of an endless, articulated drive chain that further includes the outside links 137 and the joint pins 138. Each one of the joint pins 138 has suitably journaled thereon a guide roll 139 which is illustrated in Fig. 17 as functioning to engage the inner sides of the treads of the parallel track rails 120 to maintain the truck wheels 126 registering with and traveling on said rails.

Figs. 15 and 16 best illustrate each outside link 137 of the drive chain as having rigidly fastened thereto, by means of the pairs of bolts and nuts 140, the guard or shield plate 141. Figs. 15 and 16 show the plates 141 as being of sufficient length to overlap and underlie the adjacent edge portions of the associated car tops 129. These two figures also illustrate the plates 141 as having upstanding end flanges 142 which cooperate with the flanges 143 of the car tops 129 to prevent the passage of foreign matter, such as spilled metal, mold sand, or the like, lengthwise of the mold conveyor toward the car trucks. It will be seen that the plates 141, also, function to protect the chain joints from mold sand and spilled metal.

By particularly considering Figs. 2 to 4, inclusive, it will be seen that the outside track rail 120 is curved outwardly on opposite sides of the turntable frame of the automatic jacket and weight shifter mechanism so as to carry the snap flask mold conveyor cars around the base portion of said turntable frame.

The inside track rail 120 is interrupted or is cut off adjacent the periphery of the base sprocket of the turntable frame so that the ends of this inside rail will clear the teeth 40 of the sprocket. To support the inside truck wheels 126 while traveling over the opposite sectors of the turntable sprocket, arcuate rail strips 144 are provided. These stationary rail strips are suitably joined at their outer ends to the cut off ends of the inner track rail 120 and are supported by the annular, upstanding rib 42 that was previously described as being formed on the sectors 40 of the turntable frame sprocket. These rail strips 144 are best illustrated in Figs. 2, 3 and 4.

Figs. 3 and 4 illustrate the guide rolls 139, which were described as being journaled on the joint pins of the conveyor drive chain, as meshing with the teeth 40 of the turntable sprocket. It will be appreciated, therefore, that the snap flask mold conveyor chain, which is driven by any suitable form of drive mechanism, not shown, is employed for rotating the turntable frame, and its grapple units, in proper synchronism with the travel of the snap flask mold conveyor cars. This synchronized operation of the automatic jacket and weight shifter mechanism relative to the travel of the conveyor cars is very important to assure proper engagement of the grapple arms 80 and 82 with the jackets and their weights to enable the latter to be removed from poured molds and properly applied to unpoured molds without damaging the molds.

It, also, is very important that the mold conveyor cars be arranged exactly diametrically opposite each other when they are positioned on opposite sides of the turntable frame of the automatic jacket and weight shifter mechanism. This point is best illustrated in the diagrammatic showing of Fig. 22 in which the cars of the conveyor are arbitrarily numbered from 1 to 10, inclusive, and the grapple units of the turntable frame are similarly numbered. It will be seen that the conveyor cars bearing numbers 1 and 6 should be diametrically opposite each other when they are at their median positions while bending around the opposite sides of the turntable frame sprocket. The same type of diametrical registration should occur for cars 2 and 7, 3 and 8, etc., during the travel of the conveyor and the rotation of the turntable.

To maintain this type of exact diametrical registration of the conveyor cars on opposite sides of the turntable frame, an adjustment is provided for the left-hand turn or bend of the conveyor, as seen in Fig. 22. In other words, by anchoring the turntable frame so that it will not rotate, and by properly positioning and holding conveyor car 6 at the exact median position illustrated in Fig. 22, adjustment of the left-hand bend or turn of the conveyor path in the proper direction will cause conveyor car 1 to be properly positioned at the opposite median position, or exactly diametrically opposite car 6. Any ordinary tensioning of the conveyor chain, to take care of wear, or the like, is accomplished by the adjustment indicated at the right-hand end of the conveyor path shown in Fig. 22.

It will be remembered from the detail description of the grapple unit illustrated in Figs. 5 to 9, inclusive, that the non-pivoting, inside grapple arm 82 is adjustable radially of the turntable frame to accommodate jackets and weights of different sizes while the pivoted grapple arms 80 are not adjustable for jacket size. It will be appreciated, therefore, that molds of different sizes must be uniformly positioned on the conveyor cars so that their outer sides, regardless of the difference in the sizes of the molds, must bear a given relationship to the outer, pivoted grapple arms 80.

This uniform positioning of all of the molds on the conveyor cars is accomplished through the medium of the bottom boards that are employed for supporting the molds after the snap flasks have been removed. Fig. 20 discloses the maximum or largest size bottom board while Fig. 21 shows the minimum or smallest size bottom board that can be used. Figs. 16 and 17 show in broken lines these same two extremes in bottom board sizes. It will be noted that each bottom board 150 is provided with two transversely tapered bottom grooves 151 on each side of its lower surface. These grooves are open on their bottoms and at their outer ends. It is to be understood that only one pair of grooves 151 is used at any one time for properly positioning a mold bottom board on a conveyor car top.

Figs. 15 to 17, inclusive, disclose each car top 125 as having a pair of bottom board positioning pins 152 projecting above its top surface. These pins will enter one pair of bottom board grooves 151 and the bottom board is properly positioned when the conveyor car pins 152 occupy the inner ends of the grooves.

The construction of the different sized jackets and their weights is best illustrated in Figs. 2, 3, 5, 6, 18 and 19. Fig. 18 illustrates the maximum or largest size of jacket and its weight while Fig. 19 illustrates the minimum or smallest size.

Each mold jacket 153 has a relatively long gripping lug 154 fastened to its outer, longitudinal side which is intended to cooperate with the two grapple arms 80 of the grapple unit that is adjusted to handle the jacket. The opposite longitudinal side of each jacket is provided with a gripping lug 155 that is formed with a bottom recess 156 for accommodating the single, inner grapple arm 82 of the grapple unit which is adjusted to handle the mold jacket being considered. It will be noted by particularly inspecting Figs. 6, 18 and 19 that each recess 156 is not only rounded in plan but has its side walls beveled. This construction is provided to accommodate the rounded lower end of the grapple arm 82 and to assure uniform or duplicate positioning of each jacket relative to its cooperating grapple arm 82.

Each jacket 153 is provided with two longitudinally outwardly projecting ears 157 at one end and one longitudinally outwardly projecting ear 158 at its other end. Each one of these ears 157 and 158 is provided with an upstanding pin 159.

Each weight 160 is provided with three conical recesses 161 in the bottom surface of each end portion. These recesses are intended to act as sockets for receiving the pins 159 that project upwardly from the ends of the jackets 153. In other words, the two outer recesses 161 at one end of the weight will receive the pins 159 carried by ears 157 while the center recess 161 will accommodate the pin 159 carried by the ear 158. This engagement of the pins 159 in the recesses 161 of the weights assures proper positioning of the weights when they are removed from the tops of the sand molds by the upwardly traveling jackets associated therewith.

The mode of operation of the snap flask mold conveyor and automatic jacket and weight shifter mechanism embodying this invention now will be described.

It was pointed out above that the grapple units of the automatic jacket and weight shifter mechanism can be adjusted or set to handle different sized jackets and their weights for use with a corresponding number of different sized molds. It is possible to adjust or set the illustrated number of grapple units so they will handle a maximum of ten different sizes of jackets and their weights. The maximum number of different sizes of jackets and weights that can be handled at one time is limited by the number of grapple units that are mounted on the turntable frame. Of course, any desired smaller number of different sizes of jackets and their weights can be handled at any time. It will be appreciated, therefore, that if the turntable frame were sufficiently increased in diameter, twelve grapple units could be assembled therearound and up to twelve different sizes of jackets and weights could be handled. By the same token, fourteen different sizes of jackets and weights could be handled if the turntable frame were made large enough to accommodate fourteen grapple units, while only eight different sizes could be handled if only eight grapple units were assembled around the turntable frame.

Figs. 1 and 2 of the drawings best illustrate the manner in which five different sizes of jackets and weights are handled by the snap flask mold conveyor and the automatic jacket and weight shifter mechanism. These five different sizes are designated by the reference characters S1, S2, S3, S4 and S5, reading from the smallest size jacket and its weight to the largest size.

It will be appreciated that the inner grapple arms 82 for the several grapple units will travel circular paths of different diameters, depending upon the sizes of jackets and weights they are set to accommodate. The outer grapple arms 80, however, will all follow the same irregular path or pattern, regardless of the differences in the sizes of jackets and weights being handled.

Figs. 1, 2, 3 and 23 clearly illustrate the irregular path followed by all of the outer grapple arms 80. This path of travel is represented by line G in Fig. 23. Starting with point $P^1$ on this line, which point is further illustrated in Fig. 1, it will be understood that a jacket and its weight of the size designated by the reference character S3 has been applied to an unpoured mold and the cam rail 115 has actuated the proper valve 86 to effect delivery of the pressure fluid to the upper end of the cylinder and piston unit 58 of the grapple unit at point $P^1$ to cause its outer grapple arms 80 to swing into their outermost positions.

The outer grapple arms 80 will remain in their extended positions while traveling from the point $P^1$ to the point $P^2$ on line G, see Fig. 23. This point $P^2$ is further illustrated in Fig. 1.

From point $P^2$ to point $P^3$, on line G of Fig. 23, pressure fluid will be delivered to the lower end of the cylinder and piston unit 58 of the grapple unit in question to cause the piston rod 59 to be retracted sufficiently to move the outer grapple arms 80 downwardly into parallelism with the associated inner grapple arm 82, or into the position illustrated in solid lines in Fig. 6.

It will be seen by considering Figs. 1 and 23 that a poured mold, with its casting hardened sufficiently to remove the internal pressure from the mold, has been presented to the grapple unit at the position indicated by $P^3$ in Fig. 23 by the snap flask mold conveyor A.

While the outer grapple arms 80 of a given grapple unit move from point $P^3$ to point $P^4$, on line G of Fig. 23, the pressure fluid continues to be delivered to the lower end of the associated cylinder and piston unit 58 to cause the grapple arms 80 and 82 to be raised to lift first the jacket and then the weight from the poured mold. By the time the grapple arms 80 have traveled from point $P^4$ to point $P^5$, on line G of Fig. 23, the jacket and its associated weight have been lifted entirely clear of the poured mold. This point $P^5$ is further illustrated in Fig. 1.

In other words, the removed jacket and its weight now occupy an elevated position which will permit them to clear the mold as it is carried away from the periphery of the turntable frame. The elevation of the lifted jacket and weight, also, is sufficient to clear the unpoured mold that will be delivered to the periphery of the turntable by the snap flask mold conveyor A in time to receive the elevated jacket and its associated weight.

From point P⁵ to point P⁶, on line G of Fig. 23, the grapple arms 80 and 82 of each grapple unit remain in their elevated positions by the continued application of pressure fluid to the lower end of the associated cylinder and piston unit 58.

From point P⁶ to point P⁷, on line G of Fig. 23, the valve 86 that controls the grapple unit in question is operated to bring about delivery of pressure fluid to the upper end of the cylinder and piston unit 58 for that grapple unit. This application of pressure fluid brings about lowering movement of the grapple arms 80 and 82 with the jacket and weight they are handling to cause first the weight and then the jacket to be applied to the unpoured mold that has been delivered by the snap flask mold conveyor. This point P⁷ is further illustrated in Figs. 1 and 3.

From point P⁷ to point P⁸, on line G of Fig. 23, the outer grapple arms 80 remain in their lowered positions. From point P⁸ to point P¹, the outer grapple arms 80 are swung outwardly by the application of pressure fluid to the upper end of the cylinder and piston unit 58 that effects the operation of the grapple unit in question.

It will be appreciated if an unpoured mold is not placed on a car of the conveyor A by the time the car has passed through the molding station C, the jacket and weight for that particular conveyor car will be deposited on the car and will be carried through the pouring station and the first part of the cooling period by the conveyor car. It will be seen, therefore, that the conveyor cars are employed to store the jackets and weights that are not required for a given cycle of travel of the conveyor through the pouring station.

It will be remembered, from the detail description applied to the disclosure of Fig. 22, that the snap flask mold conveyor A must be provided with mold carrying cars that are equal in number to any desired multiple of the ten grapple units assembled around the turntable frame of the automatic jacket and weight shifter mechanism. It can be considered, therefore, that a desired number of groups of conveyor cars are provided and that each group consists of ten cars.

It will be seen, by inspecting Fig. 1, that the cars which are arranged diametrically opposite each other, when positioned at the opposite median positions of the turntable frame, have been provided with molds of the same size. It will be understood, however, that this uniformity of arrangement of the different sizes can be provided only with five sizes for the ten grapple units. It is necessary, in any event, to apply some form of designation to the different cars of each group. The application of distinguishing colors to the conveyor cars has been found to be the simplest method. Therefore, the ten cars of each group will bear different designating colors while the cars bearing the same numbers in the different groups will have the same color applied thereto.

This method of distinguishing between the different cars of each group makes it possible to assign a given color to a certain molder so that he will place all of his molds, which are made with the same snap flask, only on the conveyor cars that bear his color. This assures the placing of proper sized unpoured molds on the proper conveyor cars of each group so that proper sized jackets and their weights will be applied to the proper molds.

It is to be understood that the form of this invention herewith shown and described is to be taken as the preferred example of the same, and that various changes in shape, size, and arrangement of parts may be resorted to without departing from the spirit of the invention or the scope of the subjoined claims.

Having thus described the invention, I claim:

1. Foundry equipment of the type described, comprising a single conveyor formed of an endless series of wheeled cars adapted to travel a closed path, and to carry only unpoured sand molds mounted on bottom boards through one portion of said path, only unpoured sand molds on bottom boards with jackets and weights applied to the molds through a second portion of said path, only poured sand molds on bottom boards with jackets and weights applied to the molds through a third portion of said path, and only poured sand molds on bottom boards through a fourth portion of said path, means carried by each car for engaging mold bottom boards of different lengths and widths to center all of the boards on the cars and to uniformly position one of the side edges of each one of the bottom boards relative to the same side of their respective cars, and a drive chain for interconnecting the series of cars; a turnable frame mounted in the area defined by the first two and last two mentioned portions of the conveyor path and supported for rotation about a vertical axis, drive means encircling the turntable frame and engageable with the conveyor chain for rotating said frame in synchronism with the travel of the wheeled cars of the conveyor; a plurality of grapple units carried by the turntable frame in circumferentially spaced relation, and means for actuating the grapple units in proper timed relation to the rotation of the turntable frame and the travel of the conveyor cars to cause the grapple units to seize and lift the jacket and weight in superimposed relation off of each poured sand mold as the latter reaches the end of the third portion of said path, to transport the successively lifted superimposed jackets and weights across the said conveyor defined area, and to lower and release a transported superimposed jacket and weight onto each unpoured sand mold as the latter reaches the end of the first portion of said path.

2. Foundry equipment as specified in claim 1 further characterized by the drive means comprising a sprocket having diametrically opposite sectors engaging and curving short lengths of the conveyor chain traveling between the aforesaid first two and last two mentioned portions of said closed path whereby the grapple units will operate to lift and lower the superimposed jackets and weights relative to the molds carried by the conveyor cars connected to the curved lengths of the chain.

3. Foundry equipment as specified in claim 1 further characterized by each grapple unit comprising opposed grapple arms movable relative to each other in opposite directions for seizing and releasing the jackets and weights and simultaneously movable vertically in opposite directions to lift and lower the superimposed jackets and weights relative to the molds.

4. Foundry equipment as specified in claim 1 further characterized by the drive means comprising a sprocket having diametrically opposite sectors engaging and curving short lengths of the conveyor chain traveling between the aforementioned first two and last two mentioned portions of said closed path whereby the grapple units will operate to lift and lower the superimposed jackets and weights relative to the molds carried by the cars connected to the curved lengths of the chain, and by each grapple unit comprising opposed grapple arms movable relative to each other in opposite directions for seizing and releasing the jackets and weights and simultaneously movable vertically in opposite directions to lift and lower the superimposed jackets and weights relative to the molds.

5. Foundry equipment as specified in claim 1 further characterized by the actuating means for the grapple units comprising a double-acting pressure fluid operated cylinder and piston unit for each grapple unit, a piping system for connecting all of the cylinder and piston units to a suitable source of supply of pressure fluid, valve means for controlling the flow of pressure fluid to the different cylinder and piston units, and stationary cam means for actuating the valve means.

6. Foundry equipment as specified in claim 1 further characterized by the drive means comprising a sprocket having diametrically opposite sectors engaging and curving short lengths of the conveyor chain traveling between the aforesaid first two and last two mentioned portions of said closed path whereby the grapple units will operate to lift and lower the superimposed jackets and weights relative to the molds carried by the conveyor cars connected to the curved lengths of the chain, and by the actuating means for the grapple units comprising a double-acting pressure fluid operated cylinder and piston unit for each grapple unit, a piping system for connecting all of the cylinder and piston units to a suitable source of supply of pressure fluid, valve means for controlling the flow of pressure fluid to the different cylinder and piston units, and cam means for actuating the valve means.

7. Foundry equipment of the type described, comprising a single conveyor adapted to travel through a closed path including two adjacent oppositely curved portions and to deliver to one of said curved portions unpoured molds for the application thereto of superimposed mold jackets and weights and to deliver to the other of said curved portions poured molds with applied jackets and weights which are to be removed in superimposed relation, said jackets having gripping lugs formed thereon to facilitate handling of the superimposed jackets and weights, a jacket and weight shifter mechanism mounted between said two curved portions of the conveyor path and comprising a turntable frame supported for rotation about a vertical axis, a plurality of circumferentially spaced grapple units carried by the turntable frame to travel a circular path partly overlying the two curved portions of the conveyor path, and means for actuating the grapple units in proper timed relation to the rotation of the turntable frame to cause said grapple units to successively engage the gripping lugs of the jackets and to lift said jackets and their superimposed weights off of the poured molds while said molds are traveling through said other curved portion of the conveyor path, to transport the successively lifted superimposed jackets and weights across the space between said curved portions of the conveyor path, and to lower the transported superimposed jackets and weights onto the unpoured molds, and disengage the gripping lugs, while said molds are traveling through said one of the curved portions of the conveyor path.

8. Foundry equipment as specified in claim 7 further characterized by each grapple unit comprising opposed grapple arms movable relative to each other in opposite directions for engaging and disengaging the gripping lugs of the mold jackets and simultaneously movable vertically in opposite directions for lifting and lowering the superimposed jackets and weights.

9. Foundry equipment as specified in claim 7 further characterized by the actuating means for the grapple units comprising a double-acting pressure fluid operated cylinder and piston unit for each grapple unit, a piping system for connecting all of the cylinder and piston units to a suitable source of supply of pressure fluid, valve means for controlling the flow of pressure fluid to the different cylinder and piston units, and cam means for actuating the valve means.

10. Foundry equipment as specified in claim 7 further characterized by each grapple unit comprising opposed grapple arms movable relative to each other in opposite directions for engaging and disengaging the gripping lugs of the mold jackets and simultaneously movable vertically in opposite directions for lifting and lowering the superimposed jackets and weights, and by the actuating means for the grapple units comprising a double-acting pressure fluid operated cylinder and piston unit for each grapple unit, a piping system for connecting all of the cylinder and piston units to a suitable source of supply of pressure fluid, valve means for controlling the flow of pressure fluid to the different cylinder and piston units, and cam means for actuating the valve means.

11. Foundry equipment as specified in claim 7 further characterized by each grapple unit comprising opposed grapple arms only one of which is pivotally movable relative to the other in opposite directions for engaging and disengaging the gripping lugs of the mold jackets and both of which are simultaneously movable vertically in opposite directions for lifting and lowering the superimposed jackets and weights, and means for adjusting the operative location of the non-pivotal one of the opposed grapple arms relative to pivotal one when they are in their jacket lug engaging positions to condition the grapple unit for handling different sized jackets and weights.

12. In foundry equipment of the type described, a snap flask mold conveyor comprising a pair of parallel rails laid out to form a closed path, a series of mold car trucks each of which comprises a main frame, a single shaft attached to said frame, and a pair of wheels journaled on the shaft to support the truck for travel over said rails, an endless drive chain formed of articulated links with each alternate link rigidly attached to and underlying one of the truck frames so that the chain will travel in the horizontal plane of and between the pair of rails, a mold car top of a size to accommodate only one mold mounted on each truck frame, and means carried by each mold car top for engaging mold bottom boards of different lengths and widths to lengthwise center all of the boards on the car tops and to uniformly position one of the side edges of each one of the boards relative to the same side edge of their respective car tops.

13. Foundry equipment as specified in claim 12 further characterized by each articulation joint of the chain comprising a vertical pin for connecting adjacent chain links, and a roller journaled on each vertical pin and engageable with the pair of rails for guiding the wheeled trucks on the rails.

14. Foundry equipment as specified in claim 12 further characterized by the chain links positioned between the said alternate links that are connected to the wheeled car frames each having a shield plate mounted thereon of a length to overlie both of the adjacent articulation joints of the chain and to underlie the edges of both of the adjacent car tops for protecting said joints from spilled materials.

BEAUFORD E. GAVIN, SR.

REFERENCES CITED

The following references are of record in the file of this patent:

UNITED STATES PATENTS

| Number | Name | Date |
|---|---|---|
| 1,119,680 | Brown | Dec. 1, 1914 |
| 1,538,576 | Mulvihill | May 19, 1925 |
| 1,578,549 | Saad | Mar. 30, 1926 |
| 1,734,174 | McCabe | Nov. 5, 1929 |
| 1,752,175 | Harmes | Mar. 25, 1930 |
| 1,779,484 | McWane | Oct. 28, 1930 |
| 1,789,860 | Bennington | Jan. 20, 1931 |
| 1,798,485 | Mulvihill | Mar. 31, 1931 |
| 1,808,689 | Stenhouse | June 2, 1931 |
| 1,873,096 | Woody | Aug. 23, 1932 |
| 1,935,739 | Freese | Nov. 21, 1933 |
| 2,038,518 | Badger | Apr. 28, 1936 |
| 2,068,835 | Wurster | Jan. 26, 1937 |
| 2,124,639 | Spensley | June 26, 1938 |
| 2,154,967 | Wurster | Apr. 18, 1932 |
| 2,366,581 | Whittaker | Jan. 2, 1945 |
| 2,415,997 | Eldred | Feb. 18, 1947 |